United States Patent
Eslambolchi et al.

(10) Patent No.: US 7,440,694 B1
(45) Date of Patent: *Oct. 21, 2008

(54) SONET OUTAGE IMPACT MEASUREMENT TECHNIQUE

(75) Inventors: Hossein Eslambolchi, Los Altos Hills, CA (US); Kerrie L. Linker, Red Bank, NJ (US); Alexander Novokshanov, Alpharetta, GA (US); Harold Jeffrey Stewart, Alpharetta, GA (US); Denis Sergeyevich Yankin, Alpharetta, GA (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/983,295

(22) Filed: Nov. 8, 2007

Related U.S. Application Data

(63) Continuation of application No. 10/899,408, filed on Jul. 26, 2004, now Pat. No. 7,313,324.

(60) Provisional application No. 60/490,176, filed on Jul. 25, 2003.

(51) Int. Cl.
*H04B 10/08* (2006.01)
*H04J 14/08* (2006.01)

(52) U.S. Cl. .......................................... 398/25; 398/35
(58) Field of Classification Search ................... 398/14, 398/25, 35; 709/224
See application file for complete search history.

(56) References Cited

U.S. PATENT DOCUMENTS

| | | | |
|---|---|---|---|
| 5,459,716 A | 10/1995 | Fahim et al. | |
| 5,831,972 A | 11/1998 | Chen | |
| 5,920,257 A | 7/1999 | Commerford | |
| 6,097,956 A | 8/2000 | Veeravalli et al. | |
| 6,452,906 B1 | 9/2002 | Afferton et al. | |
| 6,556,659 B1 | 4/2003 | Bowman-Amuah | |
| 6,654,375 B1 | 11/2003 | Vedder | |

*Primary Examiner*—Leslie Pascal

(57) ABSTRACT

An accurate method of reporting "minutes of outage" for a SONET facility applies a set of business rules and hierarchical definitions to delete certain minutes that would otherwise be counted as "outages". In particular, any outage minutes reported for a network element taken out of service for "planned maintenance" activities are removed prior to performing the final count. Additionally, outage minutes for a "lower level" element (such as, for example an OC1 element) that overlap in time with outage minutes reported for a "high level" element are likewise removed before the count is performed. The elimination of these non-service impacting outage minutes thus results in a more accurate reporting of the actual service impact of the counted outage minutes.

4 Claims, 3 Drawing Sheets

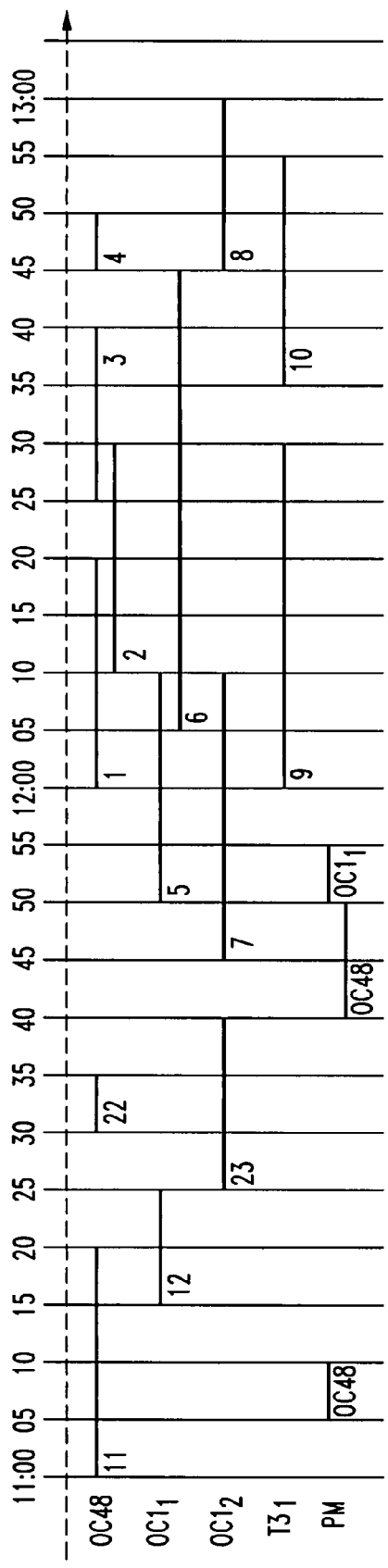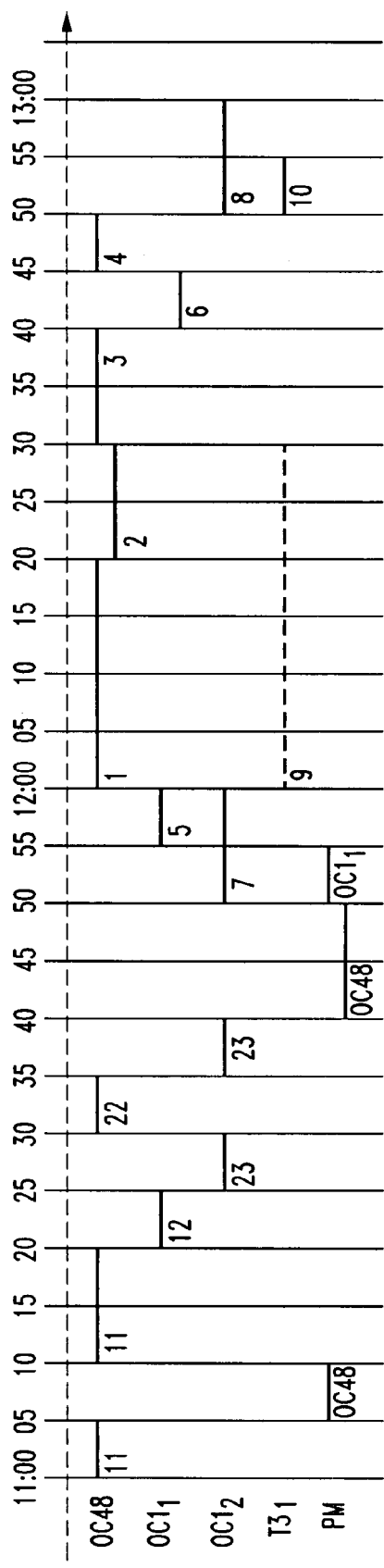

SONET OUTAGE IMPACT MEASUREMENT TECHNIQUE

CROSS REFERENCE TO RELATED APPLICATION

This application is a continuation of U.S. application Ser. No. 10/899,408, filed Jul. 26, 2004 now U.S. Pat. No. 7,313, 324 and issued a Notice of Allowance on Sep. 21, 2007, and which claims the benefit of Provisional Application No. 60/490,176, filed Jul. 25, 2003.

TECHNICAL FIELD

The present invention relates to the deployment of a Synchronous Optical Network (SONET) communication system and, more particularly, to an accurate and reliable technique for defining and counting outages on various spans of the SONET system.

BACKGROUND OF THE INVENTION

Synchronous Optical NETwork (SONET) is well-known in telecommunications to offer cost-effective transport of optical communication signals, in terms of both "access" to the network as well as transport between nodes within a telecommunications network. FIG. 1 illustrates how signals are carried in SONET. First, SONET packages a signal into "containers" 1. Section overhead 2 is then added to each container 1 so that both the signal and the quality of transmission are traceable. The containers have two different names depending on size: virtual tributary (VT) or synchronous payload envelope (SPE). The path overhead contains data to control the facility (end to end) such as for path trace, error monitoring, far-end error or virtual container (VC) composition. SONET defines Optical Carrier (OC) levels, as well as electrically equivalent Synchronous Transport Signals (STSs) for the transmission hierarchy. The base format of SONET is a synchronous STS-1 signal that operates at 51.84 Mbps.

The format of an exemplary STS-1 SONET frame 10 is illustrated in FIG. 2. As shown, STS-1 frame 10 includes 90 columns and 9 rows, yielding a frame size of 810 bytes. This equates to a basic STS-1 transfer rate of 51.84 Mb/s. The frame consists of two main areas: (1) transport overhead 12, which occupies the first three columns and (2) the synchronous payload envelope (SPE) 14, occupying the remaining 87 columns. The signal is transmitted byte-by-byte beginning with "byte one" at location 16, scanning left to right from row one to row nine. The entire frame is transmitted in 125 microseconds. Higher level signals (STS-N) are defined as integer multiples of the base rate. STS-1 frames are interleaved and converted to optics to form optical channel OC-N signals.

The performance parameters that the SONET owner measures may include, for example, code violations, errored seconds, and severely errored seconds. An errored second is defined as a one second period during which at least one errored block is transmitted. An errored block is a SONET block having at least one errored bit. A severely errored second is defined as a one second period during which 30% or more of the transmitted blocks are errored. Thus, at the STS-1 rate, an errored second occurs whenever at least one of the 6264 bits in at least one of the 8000 blocks transmitted in one second is errored. Similarly, a severely errored second occurs when t least one bit in each of at least 2400 of the 8000 transmitted blocks in one second is errored.

While monitoring a network outage, SONET technicians need to properly assess/measure the impact of the SONET outage on subscribers. In most cases, SONET outages are defined in terms of "minutes of outage" (MOO). Since the SONET hierarchy consists of various lower level and higher level facilities, it is possible for an "outage" on a lower (for example, T-1) level to be "counted" at the same time as an outage on the OC-48 level. This double-counting, as well as counting "actual" outages during planned outages (for maintenance, for example), has resulted in inaccurate reporting in terms of the impact of SONET outages on subscriber. Thus, a need remains for a technique for accurately defining the outage impact related to failures in the SONET system.

SUMMARY OF THE INVENTION

The need remaining in the prior art is addressed by the present invention, which relates to the deployment of a Synchronous Optical Network (SONET) and, more particularly, to an accurate and reliable technique for defining and counting outages on various spans of the SONET system.

In accordance with the present invention, a specific sequence of data processing procedures and business rules have been developed to improve the accuracy of counting network outage occurrences by eliminating "double counting" and recognizing planned outages—removing both types of outages from the true count. In particular, the SONET hierarchy in each monitored portion of the network is defined so that outages in "lower levels" of the network hierarchy are not counted if a higher level of the network experiences an outage at the same time. A predetermined set of "planned maintenance" (PM) outage events are added to the definition of the SONET hierarchy. The location and duration of these planned maintenance events are then compared against the occurrence of actual outages, with the actual outage duration been removed when overlaps are found, since if a particular transport even was "out of service" for scheduled maintenance, outage events for other, lower level transport elements would not be able to impact the true ability to transmit packets through the network In one embodiment of the present invention, a network snapshot is taken every five seconds—other time periods may be used. Indeed, other and further aspects of the present invention will become apparent during the course of the following discussion and by reference to the accompanying drawings.

BRIEF DESCRIPTION OF THE DRAWINGS

Referring now to the drawings,

FIG. 4 is a tabular illustration of outages associated with an exemplary SONET facility; and FIG. 5 is a revised tabular illustration of outages, the revisions associated with the deletion of "non-countable" outages as determined using the procedure of the present invention.

DETAILED DESCRIPTION

Figure 1:
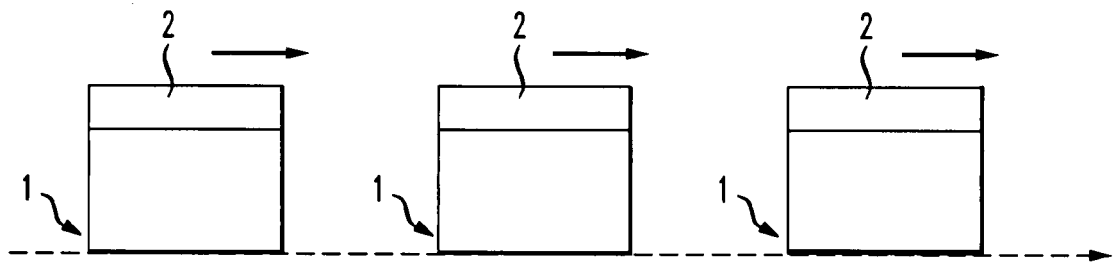
FIG. 1 illustrates an exemplary illustration of signal transfer in SONET.
Figure 2:
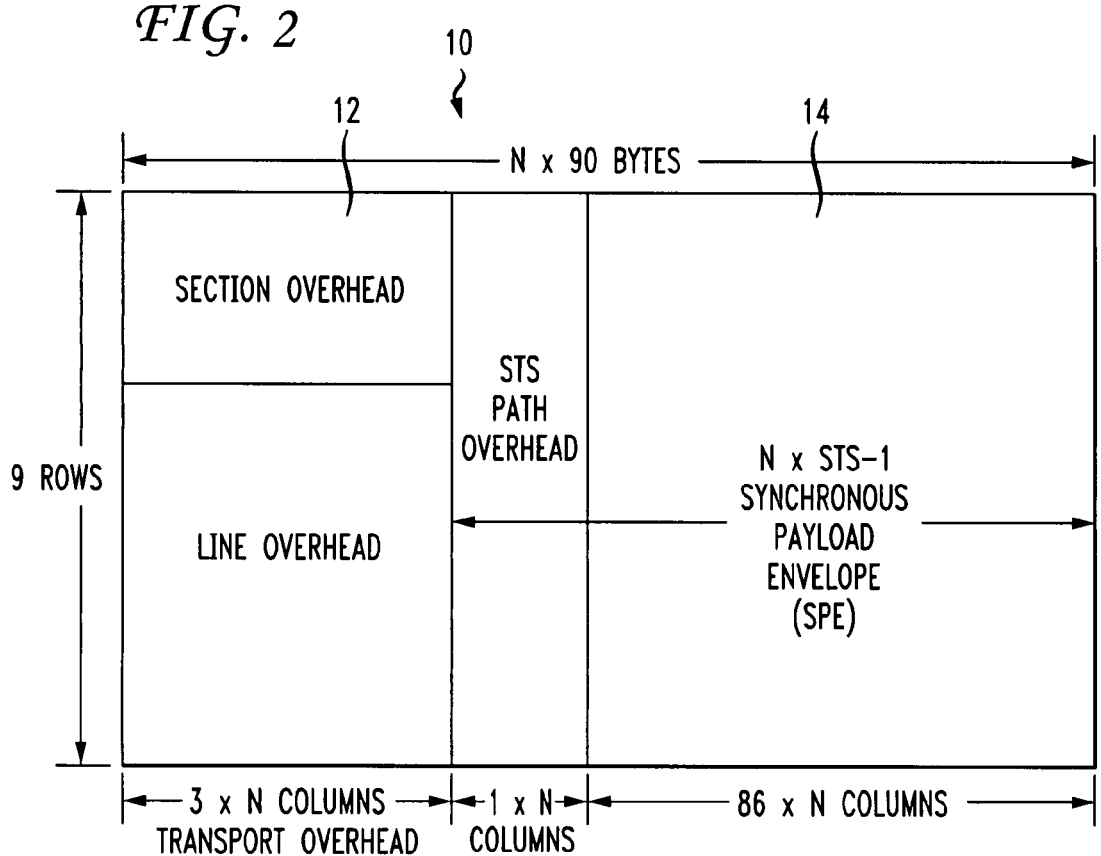
FIG. 2 depicts an exemplary SONET frame structure.
Figure 3:
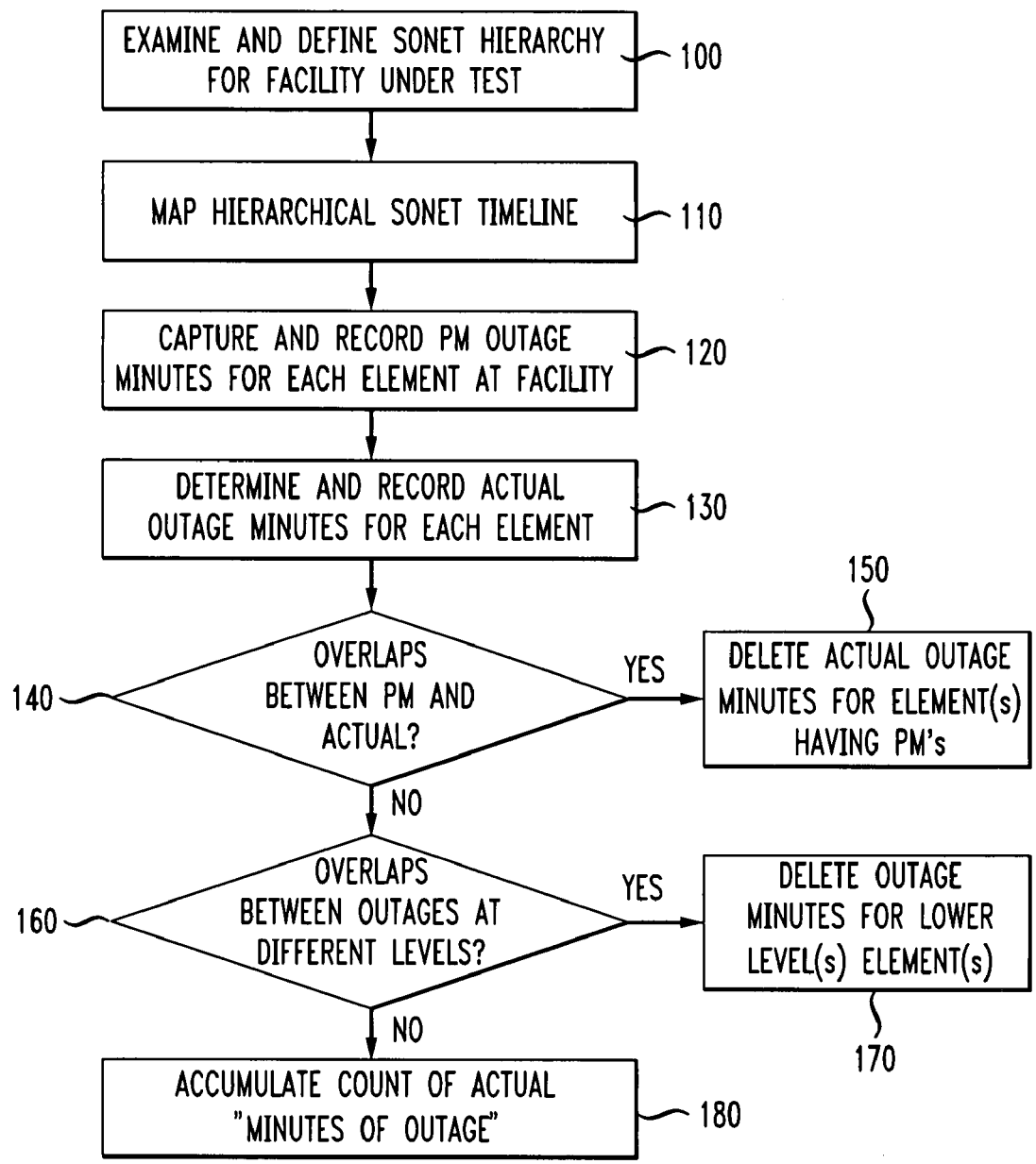
FIG. 3 contains a flowchart illustrating the exemplary steps used by the inventive procedure to accurate determine outages within a SONET facility.

FIG. 3 contains a flowchart illustrate the exemplary inventive process that may be employed to determine an accurate count of outage minutes at a SONET facility, and thereby define a more accurate "outage impact" report. Referring to FIG. 3, the first step in the process (step 100) is to define the particular network transport hierarchy at the SONET facility under study. The following table includes an exemplary definition of each element within the transport hierarchy that is to be considered when building the particular transport system being studied.

TABLE I

Transport Hierarchy
SONET and T-rate

| Optical Channel (OC) T Carrier | STS | Transmission Rate (Mbps) | Voice Channels |
|---|---|---|---|
| 192 | 192 | 9953.28 | 129,024 |
| 48 | 48 | 2488.32 | 32,256 |
| 12 | 12 | 622.08 | 8064 |
| 3 | 3 | 155.52 | 2016 |
| 1 | 1 | 51.84 | 672 |
| T3 |  | 45 |  |
| T2 |  | 6 |  |
| T1 |  | 1.5 |  |
| T0 |  | 0.064 |  |

An exemplary SONET transport hierarchy may begin, for example, with OC-48, then include one or more OC-12's, an OC-1, and several T1 carriers. Any mix of transport levels may be included in a particular transport arrangement. The hierarchy of the levels is a significant aspect of the present invention, since an outage at a "higher" (i.e., faster transmission rate) level will override a similar outage reported during the same time frame at a "lower" (slow bit rate) level. For example, a detected OC-48 outage will override any OC-12, OC-1, etc. outages flagged during the same time interval. The outage maps as illustrated in FIGS. 4 and 5 will clarify this aspect of the present invention.

Once the transport hierarchy of the to-be-studied SONET facility is defined, a timeline for each transport element in the facility is plotted (step 110), with the timeline plot preferably retaining the established hierarchy as defined during step 100. A separate line is used in the plot to indicate any planned/scheduled maintenance events for one or more of the transport elements in the SONET facility (step 120). For example, a "planned maintenance" outage for an OC-48 from 1:30 PM to 2:30 PM would be designated on the PM line and identified with this particular OC-48 element. A separate scheduled maintenance event for an OC-12 from 4:15 AM-4:30 AM would likewise be designated. The log of actual outages (indicated as "alarms") are also marked on the timeline (step 130) and associated with the particular transport element experiencing the outage.

In accordance with the present invention, by including planned maintenance events on the outage report plot, it is now possible to recognize and remove any overlaps between "actual" outages and these planned outages, thus generating an accurate count of the true outage events impacting the health of the SONET facility. Since it is recognized that a planned maintenance at a higher level (e.g., OC12) facility will override an actual outage at a lower level (e.g., OC1) facility, these actual outages should be ignored when attempting to generate an accurate count of actual outage minutes that affect network performance.

Indeed, referring again to the process flowchart of FIG. 3, the next step in the process (step 140) performs a determination to ascertain if there are any "overlaps" between planned maintenance outages and actual outages. If any overlaps do exist, the actual overlapped outage minutes are removed (step 150) before the final outage count is performed. Once a review has been completed between planned outages and actual outages, a determination is made to see if there are any overlaps between actual outages at different transport levels (step 160). As mentioned above, if an outage is recognized at a lower level transport element during the same time period as an outage at a higher level element, the outage at the lower level element(s) is ignored. This determination is designated at step 160 of FIG. 3, with the removal of the overlap outage minutes denoted as step 170.

Once all of the overlaps have been removed from the timeline, a count of the remaining outage minutes is made (step 180) that will be accurate in terms of ignoring "planned maintenance" outages and not double-counting outages at different transport levels.

FIGS. 4 and 5 contain exemplary tabular illustrations of outages associated with a particular SONET facility, with FIG. 4 containing a record of each outage as it occurred and FIG. 5 containing a "reduced" record of outages, formed by using the process of the present invention as outlined in the flowchart of FIG. 3. It is to be understood that the tabular illustrations of FIGS. 4 and 5 are exemplary only, and various other arrangements for recording/plotting this data may be used in accordance with the teaching of the present invention. Referring to FIG. 4, the particular SONET facility under study is seen as including a single OC-48 transport element, a pair of OC-1 transport elements (designated as $OC1_1$ and $OC1_2$), and a single T3 transport element. The line "PM" in the table of FIG. 4 is associated with "planned maintenance" events.

In the example as illustrated in FIG. 4, outages are measured at five minute intervals. The tabular illustration of FIG. 4 (as well as FIG. 5), begins at a time of 11:00, and ends at a time of 13:00. As shown, an "alarm 11" for OC48 occurred at 11:00 and lasted for 20 minutes (that OC48 was restored in service at 11:20. An "alarm 12" is shown as beginning for $OC1_1$ at 11:15 and ending at 11:25. Other outages are similarly illustrated, such as "alarm 9" for T3 extending from a time of 12:00 until 12:30. Also illustrated in FIG. 4 are the planned maintenance events. For example, a PM for OC48 is shown as scheduled from 11:05 until 11:10, with another PM for OC48 from 11:40 until 11:50. A PM for $OC1_1$ is shown as scheduled for 11:50 until 11:55.

In accordance with the present invention and discussed above in association with the flowchart of FIG. 3, once a set of actual outages and PMs has been charted, as shown in FIG. 4, the relationships between the various outages are compared to determine any "overlaps" in outage minutes at different elements. In particular, using the hierarchical definitions noted above and discussed in association with the flowchart of FIG. 3, the existence of any overlaps between planned maintenance events and actual outages are first discovered, where the minutes associated with the actual outages are removed from the diagram. Indeed, as shown in FIG. 5, the extent of "alarm 11" has been modified to remove the five minutes (from 11:05 to 11:10) associated with the scheduled PM event at OC48. Referring to the depiction of "alarm 7" in FIG. 4, it is shown that the first five minute interval from 11:45 to 11:50 is removed in the depiction of FIG. 5, since this interval coincides with the second planned maintenance outage for OC48. Regarding the PM for $OC1_1$, it is shown in FIG. 5 that this event results in reducing the outage minutes for "alarm 5" for $OC1_1$ (removing the five minute interval from 11:50 to 11:55). Since $OC1_1$ and $OC1_2$ are independent elements, the PM for outage $OC1_1$ does not impact the outage minutes registered for $OC1_2$ (or any other lower level transport elements).

Once the overlaps between PM outages and actual outages have been reviewed and the minutes associated with the actual outages removed from the reports, the process of the present invention progresses to the next stage, with a review of all outages within a particular "slice" of time being reviewed. In any outage overlap between different hierarchical levels is found in this review, the outage minutes at the lower level(s) are removed from the tabular illustration prior to computing the entire number of outage minutes. In comparing FIGS. 4 and 5, it is shown (for example) that a portion of "alarm 23" associated with $OC_2$ is eliminated in the table of FIG. 5, since a higher order alarm ("alarm 22") occurred during the same time slice (11:30-11:35) at OC 48. Similarly, fractures of alarm time are removed at other locations. See, for example, the overlaps between alarms 1, 2 and 3 for OC48 and $OC1_1$. In this case, the overlapped time segments associated with $OC1_1$ will be removed before the final minutes of outage count is performed. In the particular embodiment illustrated in FIGS. 4 and 5, it is shown that the entire extent of "alarm 9" within the T3 transport element is superceded by alarms at OC48 ("alarm 1" and "alarm 3") and $OC1_1$ ("alarm 2"). However, the outage is still illustrated in phantom (not for the purposes of counting minutes of outage) since knowledge of a T3 outage would still want to be known. It is to be understood that any overlaps of outage minutes between elements at the same hierarchical level are not disturbed (such as, in this case, overlaps in outage minutes between $OC1_1$ and $OC1_2$) since only a higher level outage will modify the actual number of outage minutes.

The procedure of the present invention has been described with particular reference to presently preferred embodiments thereof. However, it will be apparent to one skilled in the art that modifications and variations are possible within the spirit and scope of the invention. Furthermore, the particular flowchart of FIG. 3 is considered to be exemplary only, in that modifications may be made to the sequence and the logic contained therein without undue experimentation. Indeed, the teachings of the present invention are considered to be limited only by the scope of the claims appended hereto.

What is claimed is:

1. A method of generating an outage report comprising an accurate count of outage minutes during a predetermined time period in a Synchronous Optical NETwork (SONET) facility, the method comprising the steps of:
   a) defining a SONET network transport hierarchy including at least one high level and at least one low level, the at least one high level transmitting at a higher data rate that the at least one low level;
   b) plotting a timeline for each transport element, indicating planned maintenance outages and all actual outages;
   c) determining, for each timeline, the existence of any time overlaps between planned maintenance outages and actual outages;
   d) removing overlap outage minutes determined in step c), if any;
   e) determining, across all timeliness, the existence of any outage overlaps between the at least one high level and the at least one low level;
   f) removing overlap outage minutes from the at least one low level, if any; and
   g) totaling all remaining outage minutes from each level; and
   h) generating an outage report including the total created in step g).

2. The method as defined in claim 1 wherein at least one high level in the hierarchy is defined as the OC48 level.

3. The method as defined in claim 1 wherein at least one low level in the hierarchy is defined as the T3 level.

4. The method as defined in claim 1 wherein the hierarchy contains elements selected from the group of OC48, OC12, OC1, T3, T2 and T1, with OC48 being the highest hierarchical level and T1 being the lower hierarchical level.

* * * * *